United States Patent [19]
Bowen

[11] Patent Number: 5,924,952
[45] Date of Patent: Jul. 20, 1999

[54] FULL-TIME TRANSFER CASE WITH SYNCRONIZED RANGE SHIFT ARRANGEMENT

[75] Inventor: Thomas Bowen, Santa Rosa, Calif.

[73] Assignee: New Venture Gear, Inc., Troy, Mich.

[21] Appl. No.: 09/002,659

[22] Filed: Jan. 5, 1998

Related U.S. Application Data

[63] Continuation of application No. 08/680,948, Jul. 16, 1996, Pat. No. 5,704,867.

[51] Int. Cl.$^6$ ........................................ F16H 3/58
[52] U.S. Cl. ......................... 475/313; 475/204; 475/221
[58] Field of Search ................................. 475/311, 313, 475/204, 221, 205

[56] References Cited

U.S. PATENT DOCUMENTS

| | | | |
|---|---|---|---|
| 3,455,185 | 7/1969 | Ohno et al. | 475/205 X |
| 3,845,671 | 11/1974 | Sharp et al. | |
| 3,848,691 | 11/1974 | Dolan. | |
| 4,031,780 | 6/1977 | Dolan et al. | |
| 4,103,753 | 8/1978 | Holdeman. | |
| 4,215,593 | 8/1980 | Shono et al. | 74/665 D |
| 4,344,335 | 8/1982 | Kawai | 74/665 T |
| 4,347,762 | 9/1982 | Holdeman. | |
| 4,440,042 | 4/1984 | Holdeman. | |
| 4,552,241 | 11/1985 | Suzuki | 180/249 |
| 4,569,252 | 2/1986 | Harper. | |
| 4,644,822 | 2/1987 | Batchelor. | |
| 4,677,873 | 7/1987 | Eastman et al. | 475/221 |
| 4,677,875 | 7/1987 | Batchelor | 180/249 |
| 4,718,303 | 1/1988 | Fogelberg | 74/665 GA |
| 4,756,210 | 7/1988 | Franklin et al. | 475/204 X |
| 4,770,280 | 9/1988 | Frost | 192/53 F |
| 4,776,444 | 10/1988 | Wörner et al. | 192/850 A |
| 4,805,484 | 2/1989 | Hiraiwa | 74/665 T |
| 4,821,591 | 4/1989 | Adler | 74/339 |
| 4,848,508 | 7/1989 | Smirl et al. | 180/248 |
| 4,860,612 | 8/1989 | Dick et al. | 74/665 H |
| 4,883,138 | 11/1989 | Kameda et al. | 180/249 |
| 4,976,671 | 12/1990 | Anderson | 475/299 |
| 5,046,998 | 9/1991 | Frost | 475/221 |
| 5,054,335 | 10/1991 | Andrews | 74/665 GA |
| 5,076,112 | 12/1991 | Williams | 74/337.5 |
| 5,284,068 | 2/1994 | Frost | 74/665 GA |
| 5,323,871 | 6/1994 | Wilson et al. | 180/197 |
| 5,346,442 | 9/1994 | Eastman | 475/223 |
| 5,411,447 | 5/1995 | Frost | 475/223 |

OTHER PUBLICATIONS

"Automotive Handbook", Published By: Robert Bosch GmbH, 1986, Postfach 50, D–7000 Stuttgart 1, Automotive Equipment Product Group, Dept For Technical Information.

*Primary Examiner*—Charles A. Marmor
*Assistant Examiner*—Sherry Lynn Estremsky
*Attorney, Agent, or Firm*—Harness, Dickey & Pierce, P.L.C.

[57] ABSTRACT

A power transfer system is disclosed for a four-wheel drive vehicle operable for permitting a vehicle operator to select between various full-time and part-time four-wheel drive modes. The power transfer system includes a dualplanetary gear reduction unit that is operable for establishing high-range and low-range speed ratios, and a synchronized range shift mechanism that is adapted to permit the vehicle operator to shift on-the-fly for establishing full-time and part-time high-range and low-range four-wheel drive modes. The power transfer system includes an slip limiting/torque-biasing arrangement including an interaxle differential and a transfer clutch operable for controlling the magnitude of speed differentiation and torque biasing across the interaxle differential.

1 Claim, 8 Drawing Sheets

FULL-TIME TRANSFER CASE WITH SYNCRONIZED RANGE SHIFT ARRANGEMENT

This is a continuation of Application No. 08/680,948, filed Jul. 16, 1996, now U.S. Pat. No. 5,704,867.

BACKGROUND OF THE INVENTION

The present invention relates to a power transfer system for controlling the distribution of drive torque between the front and rear wheels of a four-wheel drive vehicle.

Due to increased consumer demand for four-wheel drive vehicles, a plethora of different power transfer systems are currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a mode shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque on-demand to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer system having a transfer case equipped with a center differential that functions to permit interaxle speed differentiation while transferring drive torque to both of the front and rear drivelines. To minimize loss of traction due to wheel slippage, full-time transfer cases are typically equipped with a slip limiting device for locking the center differential to prevent speed differentiation and, in effect, establishing a part-time four-wheel drive mode. Examples of manually-actuated differential lock-up arrangements are disclosed in commonly-owned U.S. Pat. No. 3,848,691 to Dolan and U.S. Pat. No. 4,677,873 to Eastman. An automatic differential lock-up arrangement is disclosed in commonly-owned U.S. Pat. No. 3,845,671 to Sharp et al. wherein an electrically-controlled clutch assembly is actuated to lock-up the center differential when speed differentiation due to a wheel slip condition is detected as exceeding a predetermined value. In addition, torque-biasing differential lock-up arrangements are disclosed in commonly-owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the center differential. Finally, electronically-controlled full-time transfer cases are disclosed in U.S. Pat. No. 4,718,303 to Fogelberg and U.S. Pat. No. 4,860,612 to Dick et al. wherein an electromagnetic biasing clutch is provided across the center differential to controllably bias the torque delivered to the front and rear drivelines in response to wheel slip.

To accommodate differing road surfaces and conditions, many of the above-referenced transfer cases are equipped with a gear reduction unit for providing high-range (i.e., direct drive) and low-range (i.e., reduced ratio drive) speed ratios in conjunction with the various four-wheel drive modes. Most commonly, the gear reduction units used in such dual-speed transfer cases include either a layshaft arrangement or a planetary gear assembly. However, in most current four-wheel drive vehicles, the transfer case can only be shifted between the four-wheel low-range drive mode and the four-wheel high-range drive mode when the motor vehicle is in a substantially non-motive condition. Unfortunately, the need to stop the vehicle prior to shifting between the available four-wheel drive speed ranges is inconvenient, particularly upon encountering road conditions or surface terrain where continuation of the vehicle's rolling momentum would assist in overcoming the conditions encountered. As such, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 to Andrews discloses a transfer case having a synchronized shift arrangement for a layshaft-type gear reduction unit while commonly-owned U.S. Pat. No. 5,346,442 to Eastman discloses a transfer case having a synchronized shift arrangement for a planetary-type gear reduction unit. However, while both designs advance the art, the need still exists to develop a gear reduction unit that can also be shifted "on-the-fly" from the four-wheel high-range drive mode into the four-wheel low-range drive mode.

SUMMARY OF THE INVENTION

It is therefore an object of the present invention to provide an improved power transfer system for use in four-wheel drive vehicles having a transfer case equipped with a clutch assembly for controlling the torque delivered to the front and rear wheels.

According to a preferred embodiment, the power transfer system of the present invention is operable for establishing a full-time four-wheel drive mode and includes a transfer case having an interaxle differential and a clutch assembly arranged to control speed differentiation and torque biasing across the interaxle differential, sensors for detecting and generating input signals indicative of various dynamic and operational characteristics of the vehicle, and a controller for controlling actuation of the clutch assembly in response to the sensor input signals. Under a first "on-demand" control scheme, the actuated condition of the clutch assembly is automatically changed from a non-actuated state to a fully-actuated state when the sensor input signals indicate the occurrence of a vehicular condition exceeding a predefined threshold value. Under a second "on-demand" control scheme, the actuated condition of the clutch assembly is controllably varied between its non-actuated and fully-actuated limits as a function of changes in the magnitude of one or more vehicular conditions detected by the sensors.

In addition to "on-demand" control of the clutch assembly, the power transfer system of the present invention is further adapted to establish a part-time four-wheel drive mode. To this end, a mode select mechanism is provided for permitting selection of either of the full-time or part-time four-wheel drive modes and generating a mode signal indicative thereof. The mode signal is delivered to the controller for controlling actuation of the clutch assembly. When the full-time fourwheel drive mode is selected, the clutch assembly is automatically controlled under one of the above-noted on-demand control schemes. In contrast, when the part-time four-wheel drive mode is selected, the clutch assembly is shifted into and maintained in its fully-actuated condition.

As a further feature of the present invention, the transfer case is equipped with a dual-planetary gear reduction unit and a synchronized range shift mechanism that permit "on-the-fly" shifting between the four-wheel high-range and low-range drive modes. Accordingly, the synchronized range shift mechanism permits the vehicle operator to shift the transfer case between the various full-time and part-time four-wheel high-range and low-range drive modes without stopping the vehicle.

According to another feature of the present invention, the transfer case is equipped with a gerotor-type pump assembly for delivering pressurized fluid from a sump area to a hydraulically-actuated clutch assembly, and a control valve for controlling the delivery of such pressurized fluid to the clutch assembly.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
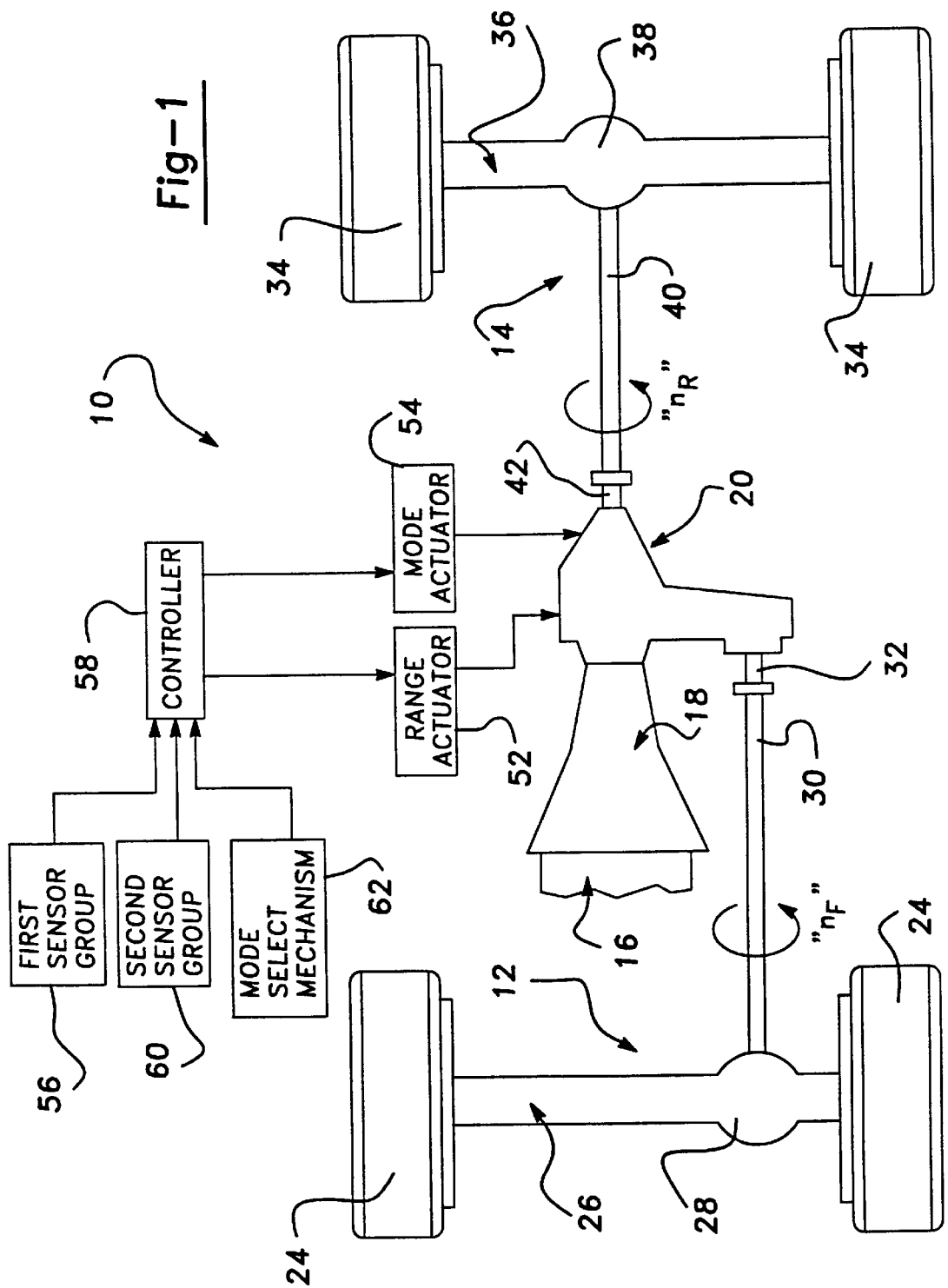
FIG. 1 is a schematic representation of a four-wheel drive motor vehicle equipped with the power transfer system of the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain is an all-wheel drive system which incorporates a transfer case 20 for transmitting drive torque from engine 16 and transmission 18 to front driveline 12 and rear driveline 14. Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear prop shaft 40, the opposite end of which is interconnected to a rear output shaft 42 of transfer case 20. As will be detailed hereinafter with greater specificity, transfer case 20 is equipped with a dual-planetary gear reduction unit 44, a synchronized range shift mechanism 46, and "slip limiting/torque-biasing" arrangement 48 including an interaxle (i.e., center) differential 22 operably interconnecting front output shaft 32 and rear output shaft 42, and a transfer clutch 50 for controlling the speed differentiation and torque biasing across center differential 22.

Power transfer system 10 further includes a first or "range" actuator 52 for actuating synchronized range shift mechanism 46, a second or "mode" actuator 54 for actuating transfer clutch 50, a first sensor group 56 for sensing specific dynamic and operational characteristics of the motor vehicle and generating sensor input signals indicative thereof, and a controller 58 for generating control signals in response to the sensor input signals. In particular, controller 58 is adapted to control the actuated condition of range shift mechanism 46 and transfer clutch 50 by sending control signals to range and mode actuators 52 and 54, respectively. Power transfer system 10 can optionally include a second sensor group 60 for generating one or more "operator-initiated" input signals that are indicative of the position of movable control elements under the control of the vehicle operator. The operator-initiated input signals are used for establishing control characteristics which, in combination with the sensor input signals, are used to generate control signals to further regulate the torque biasing across transfer clutch 50. Finally, power transfer system 10 also includes a mode select mechanism 62 for permitting the vehicle operator to select one of the available four-wheel drive modes.

With particular reference now to FIGS. 2 through 6, a preferred construction for transfer case 20 will now be described. Transfer case 20 is shown to include a housing 64 formed by a series of modular sections which are suitably interconnected by a plurality of threaded fasteners 66. An input shaft 68 is shown rotatably supported in housing 64 via a bearing assembly 70. A transmission output shaft, partially shown at 72, is coupled (i.e., splined) to input shaft 68 such that both are rotatably driven by engine 16 of the motor vehicle. Dual-planetary gear reduction unit 44 is installed between input shaft 68 and a quill shaft 74 and is operable, in conjunction with synchronized range shift mechanism 46, for selectively establishing a direct speed ratio (i.e., high-range) and a reduced speed ratio (i.e., low-range) drive connection therebetween. Thus, a "high-range" drive mode is established when quill shaft 74 is driven at the direct speed ratio (i.e., 1:1) relative to input shaft 68 and a "low-range" drive mode is established when quill shaft 74 is driven at the reduced speed ratio (i.e., 0.50:1) relative to input shaft 68. Finally, dual-planetary gear reduction unit 44 is operable for establishing a "Neutral" non-driven mode for interrupting the transfer of drive torque from input shaft 68 to quill shaft 74.

Figure 3:
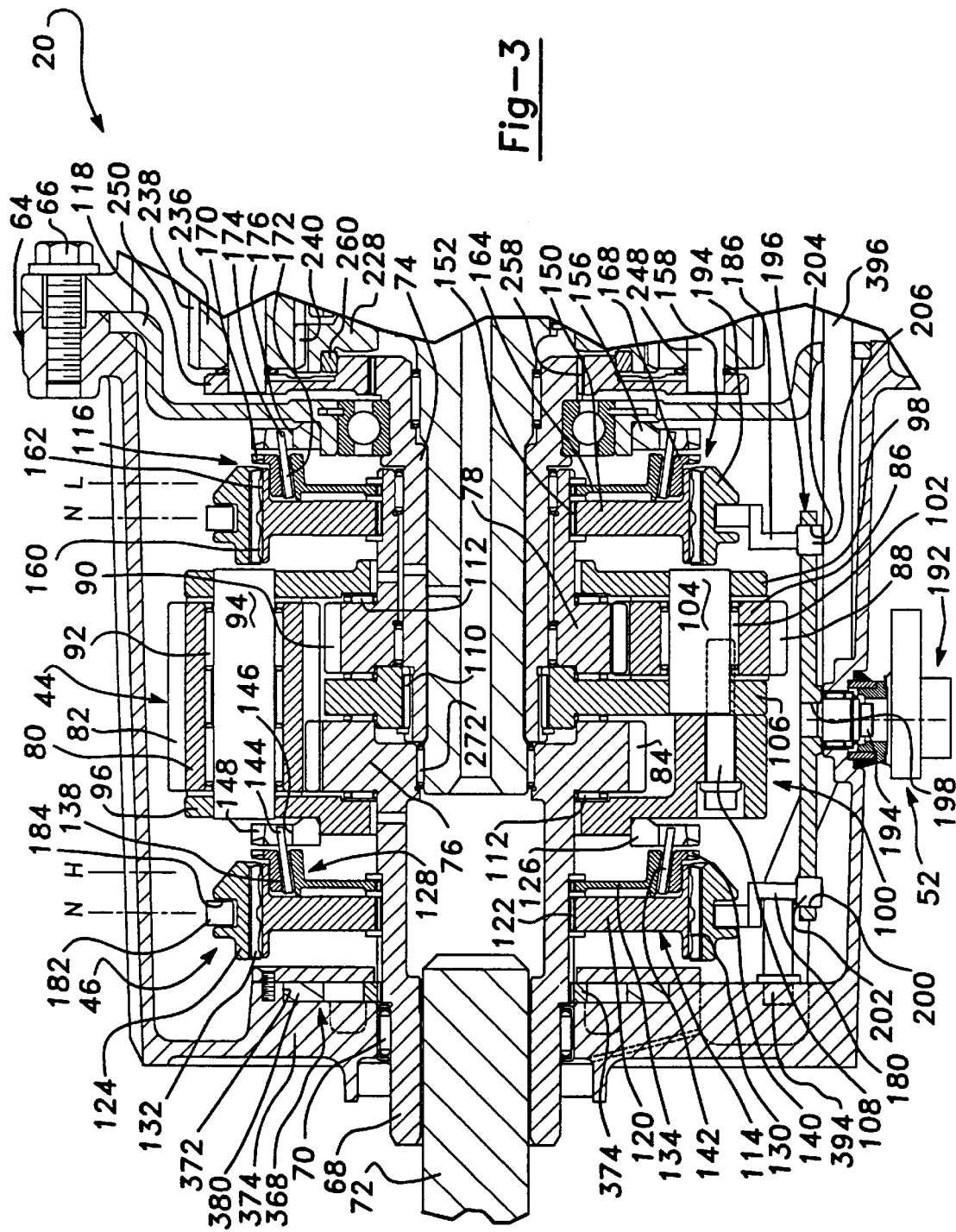
FIG. 3 is an enlarged fragmentary view of FIG. 2 illustrating the dual-planetary gear reduction unit and synchronized range shift mechanism in greater detail.

As best seen from FIG. 3, dual-planetary gear reduction unit 44 includes a first sun gear 76 integrally formed on input shaft 68, a second sun gear 78 rotatably supported on quill shaft 74, a set of full-length or first planet gears 80 each having teeth 82 meshed with teeth 84 of first sun gear 76, and a set of half-length or second planet gears 86 each having teeth 88 meshed with teeth 82 of one of first planet gears 80 and teeth 90 of second sun gear 78. Each full-length planet gear 80 is rotatably supported via bearings 92 on a pinion shaft 94, the opposite ends of which are mounted in front and rear carrier rings 96 and 98, respectively, of a carrier assembly 100. Similarly, each half-length planet gear 86 is rotatably supported via bearings 102 on a pinion shaft 104, the opposite ends of which are mounted in central and rear carrier rings 106 and 98, respectively, of carrier assembly 100. Preferably, carrier rings 96, 106, and 98 are secured together by suitable fasteners, such as bolts 108. Central carrier ring 106 is shown to be coupled via a splined connection 110 to quill shaft 74. To facilitate relative rotation between the various components of dual-planetary gear reduction unit 44, suitable thrust bearings 112 are shown positioned between the carrier rings and the sun gears.

According to the presently preferred embodiment, first sun gear 76 has its gear teeth 84 located at a first radial distance from the principal axis, denoted by axis line "A", of quill shaft 74 while gear teeth 90 of second sun gear 78 are located at a second lesser radial distance relative to the principal axis. Each full-length planet gear 80 extends longitudinally substantially the full axial extent between front and rear carrier rings 96 and 98. Similarly, each half-length planet gear 86 extends longitudinally substantially the full axial extent between center and rear carrier rings 106 and 98. To provide the desired reduced speed ratio across dual-planetary gear reduction unit 44, first sun gear 76 has forty-three teeth, second sun gear 78 has thirty-eight teeth, full-length planet gears 80 have eighteen teeth, and half-length planet gears 86 have twenty-one teeth.

To provide means for selectively establishing the high-range and low-range drive connections between input shaft 68 and quill shaft 74, synchronized range shift mechanism 46 is provided in conjunction with dual-planetary gear reduction unit 44. As will be detailed. synchronized range shift mechanism 46 is operable for permitting transfer case 20 to be shifted "on-the-fly" between the four-wheel high-range and low-range drive modes. As best seen from FIG. 3, synchronized range shift mechanism 44 includes a first synchronizer clutch apparatus 114 and a second synchronizer clutch apparatus 116. In general, first synchronizer clutch apparatus 114 is operable for establishing the high-range drive connection between input shaft 68 and quill shaft 74 by directly coupling carrier assembly 100 of dual-planetary gear reduction unit 46 to input shaft 68. Since central carrier ring 106 is fixedly splined to quill shaft 74, direct coupling of carrier assembly 100 to input shaft 68 results in quill shaft 74 likewise being driven without reduction by input shaft 68. In contrast, second synchronizer clutch apparatus 116 is operable for establishing the low-range drive connection between input shaft 68 and quill shaft 74 by coupling second sun gear 78 to a central web plate 118 of housing 64. Such a coupling results in the braking of second sun gear 78 which, in turn, causes carrier assembly 100 to be rotatably driven at the desired reduced speed ratio relative to input shaft 68. An inherent advantage of dual-planetary gear reduction unit 44 is that, since no direct mechanical path is established between it and housing 64 in either of the high-range or low-range drive connections, no direct noise path is established for providing a quiet range shift device.

First synchronizer clutch apparatus 114 is shown to include a hub 120 that is fixed via a splined connection 122 to input shaft 68, a first range sleeve 124 supported for rotation with and axial sliding movement on hub 120, a first clutch plate 126 fixed (i.e., welded, etc.) to front carrier ring 96, and a cone-type synchronizer assembly 128. As best seen in FIG. 3, hub 120 has external longitudinal splines 130 formed on its outer peripheral rim and first range sleeve 124 has internal longitudinal splines 132 meshed therewith. First range sleeve 124 is shown positioned in its neutral position, denoted by position line "N". Cone-type synchronizer assembly 128 is a dual-cone arrangement having an inner ring 134 fixed via a splined connection to input shaft 68, an outer blocker ring 138 having blocker teeth 140, and a reaction ring 142 having drive tangs 144 projecting into apertures 146 formed in clutch plate 126. As is otherwise conventional, the cone torque developed between the facing conical surfaces of inner ring 134, blocker ring 138 and reaction ring 142 inhibits splines 132 of first range sleeve 124 from passing through blocker teeth 140 and into meshed engagement with clutch teeth 148 on clutch plate 126 until speed synchronization between carrier assembly 100 and input shaft 68 is complete. Once speed synchronization is complete, first range sleeve 124 is free to move to its high-range position, denoted by position line "H", whereat its splines 132 are coupled to clutch teeth 148 on clutch plate 126 for establishing the high-range drive connection between input shaft 68 and quill shaft 74.

With continued reference to FIG. 3, the components of second synchronizer apparatus 116 are shown to be substantially similar to those of first synchronizer apparatus 114 and include a hub 150 fixed via a splined connection 152 to second sun gear 78, a second range sleeve 154 supported for rotation with and axial sliding movement on hub 150, a second clutch plate 156 fixed to web plate 118 of housing 64, and a dual-cone synchronizer assembly 158. Second range sleeve 154 has internal longitudinal splines 160 that are meshed with external longitudinal splines 162 formed on the outer peripheral rim of hub 150 and is shown in its neutral position, denoted by position line "N". Dual-cone synchronizer assembly 158 includes an inner ring 164 fixed via splined connection to second sun gear 78, a blocker ring 168 having blocking teeth 170, and a reaction ring 172 having tangs 174 projecting into apertures 176 formed in second clutch plate 156. In operation, dual-cone synchronizer assembly 158 inhibits splines 160 of second range sleeve 154 from passing through blocking teeth 170 of blocker ring 168 and into coupled engagement with clutch teeth 178 on second clutch plate 156 until speed synchronization between housing web plate 118 and second sun gear 78 is complete. Obviously, such speed synchronization results in second sun gear 78 being braked and held stationary due to its direct coupling to housing 64. Upon completion of speed synchronization, second range sleeve 154 is permitted to move to its low-range position, denoted by position line "L", whereat its splines 160 are coupled to clutch teeth 178 of second clutch plate 156 for establishing the low-range drive connection between input shaft 68 and quill shaft 74.

In addition to establishing the high-range and low-range drive modes, dual-planetary gear reduction unit 44 is also operable to establish a Neutral non-driven mode in which quill shaft 74 is not rotatably driven by input shaft 68. Thus, when it is desired to shift transfer case 20 into its Neutral mode, first and second range sleeves 124 and 154 are both moved to their respective neutral positions, whereat first range sleeve 124 is uncoupled from first clutch plate 126 and second range sleeve 154 is uncoupled from second clutch plate 156. As such, rotation of input shaft 68 and first sun gear 76 causes first and second planet gears 80 and 86 to rotate about their respective pinion shafts 94 and 104 which, in turn, causes second sun gear 78 to be rotatably driven. As a result, carrier assembly 100 is not rotatably driven in response to rotation of first sun gear 76, whereby quill shaft 74 is also maintained in a non-driven state.

Synchronized range shift mechanism 46 further includes a first range fork 180 having projections 182 that are retained in a groove 184 formed in first range sleeve 124, and a second range fork 186 having projections 188 retained in a groove 190 formed in second range sleeve 154. Transfer case 20 further includes means for causing coordinated axial movement of range forks 180 and 186 for establishing the three above-noted drive modes in response to actuation of range actuator 52. Preferably, range actuator 52 is an electrically-actuated rotary device, such as a gearmotor 192, which is operable for generating an output torque, the value of which varies as a function of the magnitude of the electrical control signal applied thereto by controller 58.

To provide means for controlling coordinated movement of range sleeves 124 and 154, a rotary output member 194 of gearmotor 192 is secured to a sector plate 196 that functions to change the output torque of gearmotor 192 into an axially-directed force. As best seen from FIGS. 3 and 4, output member 194 is rotatably supported from transfer case housing 64 and is secured in an aperture 198 formed in sector plate 196. To generate the desired bi-directional axial movement of first range sleeve 124, sector plate 196 includes a first guide slot 200 in which a first roller pin 202 is retained. First roller pin 202 is secured to first range fork 180. The contour of first guide slot 200 is configured to control the amount and direction of axial movement of first roller pin 202, first range fork 180 and first range sleeve 124 in response to the magnitude and direction of rotation of sector plate 196. To generate the desired bi-directional axial movement of second range sleeve 154, sector plate 196 includes a second guide slot 204 in which a second roller pin 206 is retained. Second roller pin 206 is operably secured to second range fork 186. Thus, the contour of second guide slot 204 is configured to control the desired amount and direction of axial movement of second roller pin 206, second range fork 186 and second range sleeve 154 in response to the magnitude and direction of rotation of sector plate 196.

Figure 4:
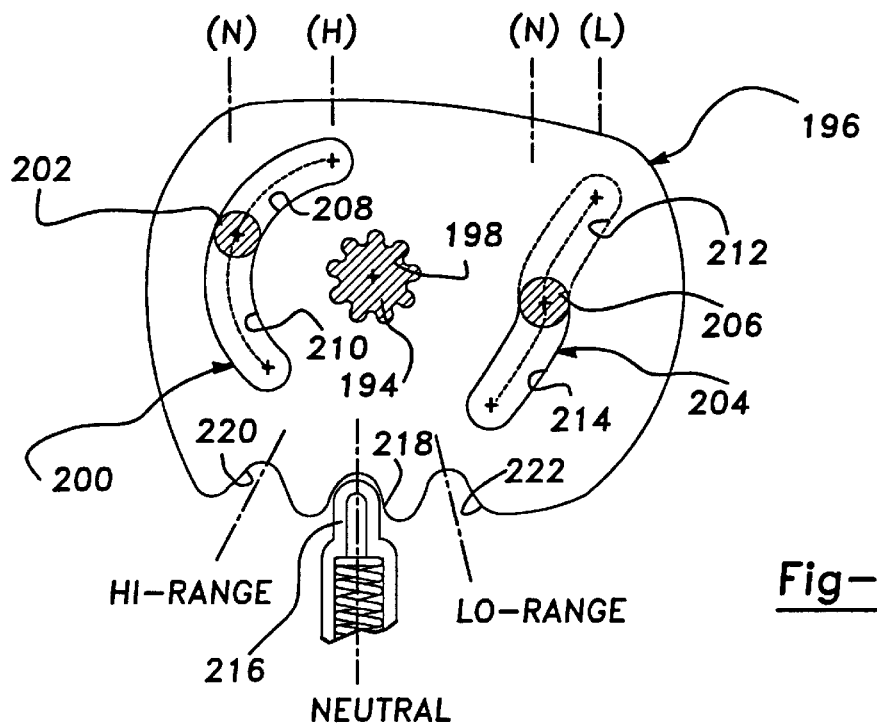
FIG. 4 is a side view of the sector plate used for controlling coordinated movement of the synchronized range shift mechanism.

With particular reference now to FIG. 4, it can be seen that sector plate 196 may be rotated by gearmotor 192 to any one of three distinct sector positions, as labelled "Hi-Range", "Neutral", and "Lo-Range". The particular speed range established between input shaft 68 and quill shaft 74 across dual-planetary gear reduction unit 44 is controlled by the position of first and second roller pins 202 and 206 within first and second guide slots 200 and 204, respectively, which, as noted, also establishes the axial location of first and second range sleeves 124 and 154. In operation, the vehicle operator selects a desired operative drive mode via actuation of mode select mechanism 62, which, in turn, signals controller 58 of the selection. Thereafter, controller 58 generates an electrical control signal that is applied to gearmotor 192 for controlling the rotated position of output member 194 and sector plate 196. Sector plate 196 is shown positioned in its Neutral sector whereat first roller pin 202 is centrally located in first guide slot 200 at the intersection of its first and second slot segments 208 and 210 to define its neutral (N) position and locate first range sleeve 124 in its neutral position. Similarly, second roller pin 206 is centrally located in second guide slot 204 at the intersection of its first and second slot segments 212 and 214 to define its neutral (N) position and locate second range sleeve 154 in its neutral position. A spring-biased poppet assembly 216 is shown located in a central detent 218 for positively locating sector plate 196 in its Neutral sector position.

When mode select mechanism 62 signals selection of a four-wheel high-range drive mode, controller 58 sends a control signal to gearmotor 192 for causing sector plate 196 to be rotated in a first (i.e., counterclockwise) direction until poppet assembly 216 is located in a high-range detent 220 for locating sector plate 196 in its Hi-Range sector position. Such rotation of sector plate 196 causes first roller pin 202 to travel in slot segment 208 of first guide slot 200, the contour of which causes first roller pin 202 to move axial from the (N) position shown to the (H) position which, in turn, causes first range sleeve 124 to move from its neutral position to its high-range position. Concurrently, second roller pin 206 is guided within slot segment 214 of second guide slot 204 which is configured for maintaining second roller pin 206 in its (N) position which, in turn, maintains second range sleeve 154 in its neutral position.

When mode select mechanism 62 signals selection of a four-wheel low-range drive mode, controller 58 sends an electrical control signal to gearmotor 192 for causing sector plate 196 to be rotated in a second (i.e., clockwise) direction until poppet assembly 216 is located in a low-range detent 222 for locating sector plate 196 in its Lo-Range sector position. Such rotation of sector plate 196 results in first roller pin 202 being guided within slot segment 210 of first guide slot 200, the contour of which maintains first roller pin 202 in its (N) position which, in turn, maintains first range sleeve 124 in its neutral position. Concurrently, second roller pin 206 is guided within slot segment 212 of second guide slot 206, the contour of which causes second roller pin 206 to move axially from its (N) position to the (L) position which, in turn, causes moving second range sleeve 154 to move from its neutral position to its low-range position. Sector plate 196 can be rotated directly from its Lo-Range sector position into its Hi-Range sector position as well as directly from its Hi-Range sector position into its Lo-Range sector position. Poppet assembly 216 may provide an electrical signal to controller 58 that is indicative of the rotated position of sector plate 196.

Figure 2:
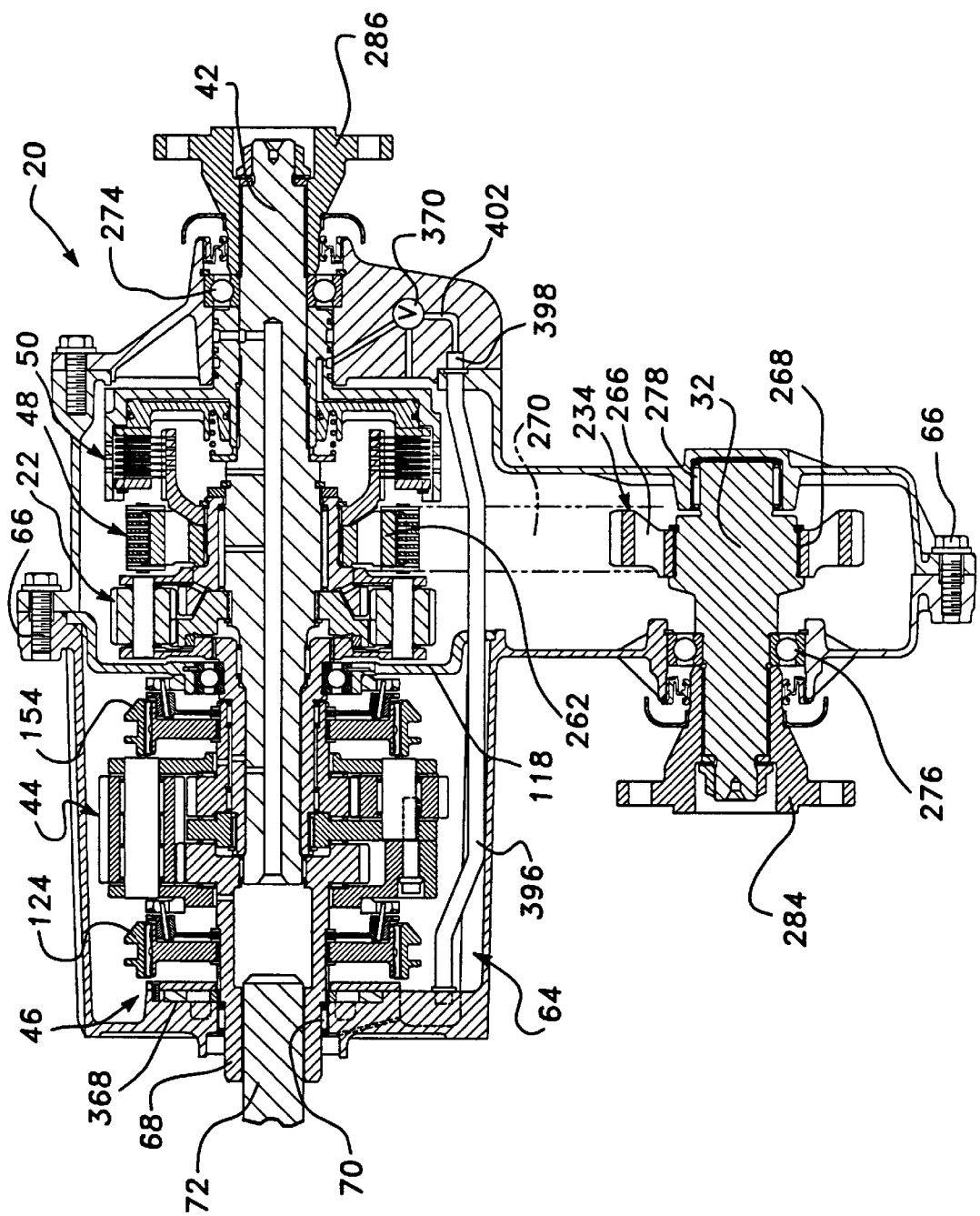
FIG. 2 is a cross-sectional view illustrating the full-time transfer case of the present invention.
Figure 6:
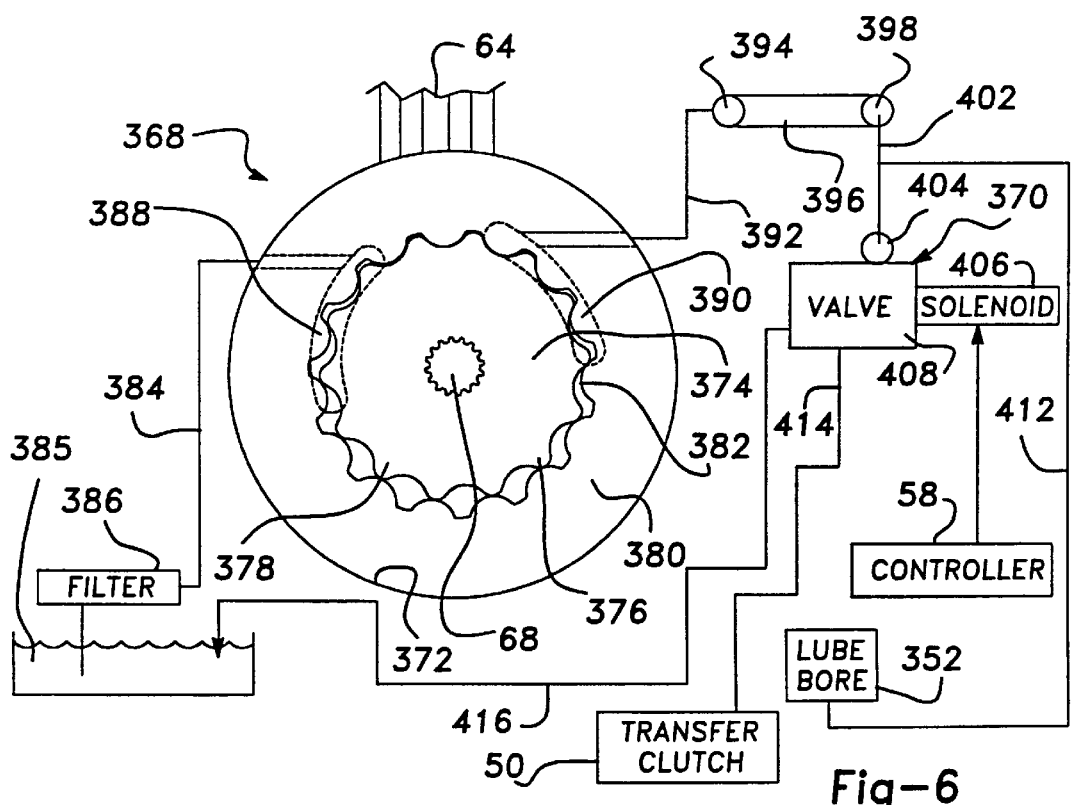
FIG. 6 is a schematic view of the hydraulic system used for controlling actuation of the clutch assembly.
Figure 5:
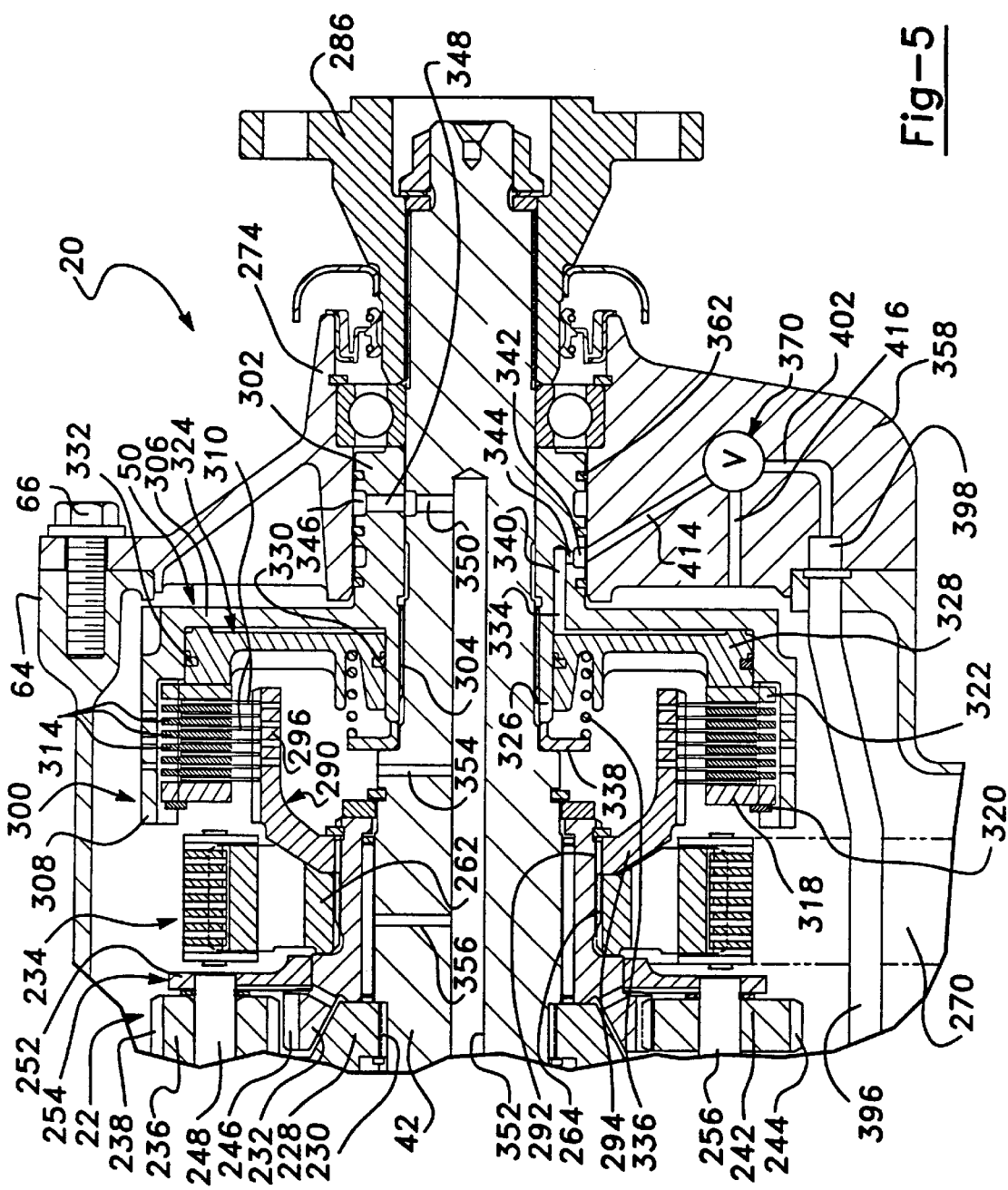
FIG. 5 is another enlarged fragmentary view of FIG. 2 showing the interaxle differential and clutch assembly in greater detail.

With particular reference now to FIGS. 2, 3 and 6, the various components associated with slip limiting/torque-biasing arrangement 48 in transfer case 20 will now be described. Specifically, center differential 22 is provided for mechanically coupling quill shaft 74 to front output shaft 32 and rear output shaft 42 to facilitate speed differentiation while distributing drive torque therebetween. While any suitable differential unit is contemplated for use with transfer case 20, center differential 22 is preferably a dual-planetary gearset having a first sun gear 228 fixed via a splined connection 230 to rear output shaft 42, a second sun gear 232 fixed via a chain drive assembly 234 to front output shaft 32, a set of full-length or first pinion gears 236 each having teeth 238 meshed with teeth 240 of first sun gear 228, and a set of half-length or second pinion gears 242 each having teeth 244 meshed with teeth 238 of one of first pinion gears 236 and teeth 246 of second sun gear 232. Each first pinion gear 236 is rotatably supported on a long pinion shaft 248, the opposite ends of which are mounted in front and rear carrier rings 250 and 252, respectively, of a carrier assembly 254. Similarly, each second pinion gear 236 is rotatably supported on a short pinion shaft 256, the opposite ends of which are likewise mounted to carrier rings 250 and 252. Each set of first pinion gears 236 and second pinion gears 242 is equally-spaced on carrier assembly 254 with one first pinion gear 236 constantly meshed with one second pinion gear 242. Front carrier ring 250 is shown to be coupled via a splined connection 258 to quill shaft 74. A separator ring 260 is located between front carrier ring 250 and first sun gear 228 to facilitate relative rotation therebetween. Likewise, rear carrier ring 252 is shown to be journally supported on second sun gear 232.

Chain drive assembly 234 includes a drive sprocket 262 fixed via a splined connection 264 to second sun gear 232, a driven sprocket 266 fixed via a splined connection 268 to front output shaft 32, and a continuous chain 270 interconnecting driven sprocket 266 to drive sprocket 262. Thus, driven rotation of quill shaft 74 causes center differential 22 to drive front and rear output shafts 32 and 42, respectively, at a predetermined speed ratio with respect to one another. As is known, the torque distribution (i.e., the torque split) normally delivered across center differential 22 to output shafts 32 and 42 is a ratio determined by the particular gear geometry associated with the intermeshed gear components of the dual-planetary gearset. Rear output shaft 42 is shown to have its forward end rotatably supported by a bearing assembly 272 mounted in a piloted bore in input shaft 68 and its rearward end rotatably supported by a bearing assembly 274 mounted to housing 64. Likewise, front output shaft 32 is shown rotatably supported in housing 64 via bearing assemblies 276 and 278. Finally, a front flange 284 and a rear flange 286 are shown respectively mounted to front and rear output shafts 32 and 42 for facilitating otherwise conventional interconnection of each to front and rear drivelines 12 and 14, respectively.

Transfer clutch 50 is installed within transfer case 20 for controlling speed differentiation and the resulting torque distribution between front output shaft 32 and rear output shaft 42. As best seen from FIGS. 2, 3 and 6, transfer clutch 50 is a multi-plate friction clutch assembly which includes an inner drum 290 fixed via a splined connection 292 to second sun gear 232. In particular, inner drum 290 is formed to include an annular hub segment 294 splined to second sun gear 232 and a cylindrical rim segment 296 formed at the opposite end of hub segment 294. Transfer clutch 50 further includes an outer drum 300 shown to have an elongated hub segment 302 fixed via a splined connection 304 to rear output shaft 42, a radial web segment 306 extending from hub segment 302, and a cylindrical rim segment 308 extending forwardly from web segment 306. Rim segment 308 of outer drum 300 is arranged to generally overlie and surround rim segment 296 of inner drum 290. Disposed therebetween are two sets of alternately interleaved friction clutch plates that can be frictionally compressed for limiting speed differentiation and biasing the torque distribution across center differential 22. In particular, a set of inner clutch plates 310 are mounted via a splined connection to rim segment 296 of inner drum 290 for rotation with second sun gear 232 and front output shaft 32. Likewise, a set of outer clutch plates 314 are mounted via a splined connection to rim segment 308 of outer drum 300 for rotation with first sun gear 228 and rear output shaft 42. The interleaved clutch plates 310 and 314 are supported for axial sliding movement to establish frictional contact between. A front thrust plate 318 is splined to rim segment 308 of outer drum 300 for rotation with outer clutch plates 314 and is retained thereon via a retainer ring 320. Likewise, a rear thrust plate 322 is splined to rim segment 308 for rotation with outer clutch plates 314.

Transfer clutch 50 is shown to further include a thrust mechanism 324 supported for axial sliding movement on a tubular sleeve segment 326 of outer drum 300 and which is operable for frictionally compressing the interleaved clutch plates. Thrust mechanism 324 includes a piston 328 having both of its inner and outer peripheral surfaces sealed in a fluid-tight manner relative to sleeve segment 326 and rim segment 308 of outer drum 300 via o-ring seals 330 and 332 to form a pressure chamber 334 therewith. A return spring 336 is disposed under compression between piston 328 and a retainer plate 338 for normally urging piston 328 in a direction away from the interleaved clutch plates. Pressure chamber 334 is in fluid communication with a one or more (one shown) passageways 340 formed in hub segment 302 of outer drum 300. A first circumferential groove 342 formed in the outer peripheral surface of hub segment 302 of outer drum 300 communicates with passageway 340 via a radial port 344. As is also seen, a second circumferential groove 346 formed in the outer peripheral surface of hub segment 302 of outer drum 300 communicates with one or more (one shown) radial flow passages 348 which, in turn, communicate with a corresponding number of radial bores 350 formed in rear output shaft 42. Radial bores 350 communicate with a lubrication bore 352 formed centrally in rear output shaft 42 which, by way of radial ports 354 and 356 provides lubrication to the various components concentrically mounted on rear output shaft 42.

Housing 64 is shown to include a segment, hereinafter referred to as pump housing 358, that is secured to the remainder of housing 64 by suitable bolts 66. Pump housing 358 is adapted to surround and enclose hub segment 302 of outer drum 300 and support bearing assembly 274. A plurality of ring seals 362 are provided to establish a fluid-tight seal between grooves 342 and 346 and pump housing 358. To provide means for supplying pressurized fluid to first groove 342 for actuating transfer clutch 50, mode actuator 54 includes a gerotor pump assembly 368 and an electrically-actuated control valve 370. Pump assembly 368 is mounted in a pump chamber 372 formed in a front flange segment 374 of housing 64. Pump chamber 372 is formed to be eccentric to the rotational axis of input shaft 68. Pump assembly 368 includes a rotor 374 that is fixed via a splined connection 376 to input shaft 68 for concentric rotation therewith. Rotor 374 includes a predetermined number of external tooth-like lobes 378 formed thereon. Pump assembly 368 also includes a pump ring 380 rotatably mounted within pump chamber 372 and includes a predetermined number of internal tooth-like lugs 382 formed therein. In the particular embodiment shown, pump assembly 368 is constructed such that rotor 374 has fourteen lobes 378 intermeshed with fifteen lugs 382 on pump ring 380. As schematically shown in FIG. 6, an oil feed tube 384 is provided for drawing fluid from a sump area 385 within housing 64, through a filter assembly 386, and into an inlet port 388 of pump assembly 368. Driven rotation of rotor 374 relative to slower rotation of pump ring 380 delivers pressurized fluid to an outlet port 390 of pump assembly 368.

A supply bore 392 (FIG. 6) formed in flange segment 374 of housing 64 provides fluid communication between outlet port 390 of pump assembly 368 and an inlet 394 of a supply tube 396. An outlet 398 of supply tube 396 is in fluid communication with a supply bore 402 formed in pump housing 358 which fluidly communicates with a supply port 404 of electrically-actuated control valve 370. As schematically shown in FIG. 6, supply bore 402 is also in fluid communication with a lubrication passage 412 formed in pump housing 358 for delivering fluid to second groove 346, thereby continuously delivering fluid through lubrication bore 352. Control valve 370 includes an electromagnetic solenoid 406 and a spool valve 408 retained for sliding movement in a control chamber formed in pump housing 358. Solenoid 406 is connected to controller 58 to receive electrical control signals therefrom for controlling the position of spool valve 408 within the control chamber. Preferably, spool valve 408 is movable between a first position and a second position in response to controlled actuation of solenoid 406. In the first spool position, a pump passage 414 formed in pump housing 358, and which communicates with first groove 342, is placed in fluid communication with an exhaust passage 416. Thus, in the first spool position, return spring 336 is permitted to move piston 328 away from the interleaved clutch plate for forcibly exhausting fluid from within pressure chamber 334. Upon release of pressurized fluid from within pressure chamber 334, the clutch engagement force exerted on interleaved clutch plates 310 and 314 by piston 328 is decreased until transfer clutch 50 is considered to be operating in its "non-actuated" state. With transfer clutch 50 operating in its non-actuated state, center differential 22 is unrestricted to facilitate interaxle differentiation between front output shaft 32 and rear output shaft 42. In contrast, when spool valve 408 is shifted to its second spool position, supply port 404 is placed in fluid communication with pump passage 414 for supplying pressurized fluid to pressure chamber 334. Increasing fluid pressure within pressure chamber 334 cause piston 328 to be forcibly moved toward the interleaved clutch plates and exert a corresponding clutch engagement force thereon. Concurrently, communication between pump passage 414 and exhaust passage 416 is interrupted, thereby permitting a maximum clutch engagement force to be applied by piston 328 for placing transfer clutch 50 in its "fully-actuated" state. With transfer clutch 50 operating in its fully-actuated state, first and second sun gears 198 and 202 are locked against relative rotation, thereby inhibiting relative rotation between front output shaft 32 and rear output shaft 42.

Movement of spool valve 408 between its two positions can be controlled under either of an ON/OFF control scheme or an ADAPTIVE control scheme. Under the ON/OFF control scheme, spool valve 408 is moved to one of its two positions in response to the control signal sent to solenoid 406 by controller 58. In such an arrangement, spool valve 408 is normally maintained in its first position such that transfer clutch 50 is likewise maintained in its non-actuated state to permit speed differentiation between front and rear output shafts 32 and 42, respectively. In this condition, transfer case 20 is defined as operating in its full-time "differentiated" four-wheel drive mode. However, when the sensor input signals indicate a vehicular condition exceeding a predetermined value, solenoid 406 is energized for moving spool valve 408 to its second position, whereby transfer clutch 50 is fully-actuated for locking-up center differential 22 such that front and rear output shafts 32 and 42 are, in effect, rigidly coupled for establishing a "non-differentiated" four-wheel drive mode. Preferably, the primary vehicular condition used for controlling actuation of transfer clutch 50 is the interaxle speed differential between front drive shaft 32 and rear drive shaft 42. Once the sensor input signals detect that the magnitude of the vehicular condition has fallen below the predetermined value, controller 58 signals solenoid 406 to return spool valve 408 to its first position for returning transfer clutch 50 to its non-actuation state.

Controller 58 can alternatively be programmed utilizing the ADAPTIVE control scheme to regulate the actuated condition of transfer clutch 50 between its non-actuated and fully-actuated limits for proportionally varying the magnitude of speed differentiation and drive torque transmitted across center differential 22 as a function of the sensor input signals. Under such a scenario, control valve 370 would most likely be replaced with a variable orifice-type solenoid-actuated control valve capable of regulating fluid pressure. In operation, transfer clutch 50 increases the drive torque delivered to the slower turning output shaft while concurrently decreases the drive torque delivered to the faster turning output shaft in an amount equal to the torque capacity of transfer clutch 50 at a given actuated state. Under either of the above-noted control schemes, control over actuation of transfer clutch 50 is automatic and does not require any act or mode selection on the part of the vehicle operator.

Transfer case 20 is capable of establishing at least five distinct operative modes, namely, a full-time four-wheel high-range drive mode, a part-time four-wheel high-range drive mode, a Neutral non-driven mode, a full-time four-wheel low-range drive mode, and a part-time four-wheel low-range drive mode. The particular operational mode selected is established by the position of first roller pin 202 in first guide slot 200, the position of second roller pin 206 in second guide slot 204, and the actuated condition of transfer clutch 50. In operation, the vehicle operator selects a desired operative drive mode via mode select mechanism 62 which, in turn, signals controller 58 of the selection. Thereafter, controller 58 generates an electric control signal that is applied to gearmotor 192 for controlling the rotated position of sector plate 196 and an electric control signal that is applied to solenoid 406 for controlling actuation of transfer clutch 50. Mode select mechanism 62 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality of positions corresponding to the available operational modes which, in conjunction with a suitable electrical switch arrangement, generates a mode signal indicating the mode selected. In either form, mode select mechanism 62 offers the vehicle operator the option of deliberately choosing between the various operative drive modes.

Assuming availability of all of the operative modes, upon selection of either of the part-time four-wheel high-range drive mode or the part-time four-wheel low-range drive mode, sector plate 196 is controllably rotated to its corresponding position, namely its Hi-Range or Lo-Range sector position, and transfer clutch 50 is placed in its fully-actuated state. However, when either of the full-time four-wheel high-range or low-range drive modes is selected, power transfer system 10 is again operable for causing gearmotor 192 to rotate sector plate 196 to its specified sector position while causing solenoid 406 to control the actuated condition of transfer clutch 50 as a function of the various sensor and operator-initiated input signals. According to the present invention, when transfer case 20 is operating in either of the full-time four-wheel high-range or low-range drive modes, slip limiting/torquebiasing arrangement 48 is active for "on-demand" control of transfer clutch 50. Specifically, the actuated state of solenoid 406 is continuously monitored and varied in accordance with specific predefined relationships established based on the current value of the sensor input signals under either of the ON/OFF or ADAPTIVE control schemes. Thus, in the full-time four-wheel drive modes, power transfer system 10 acts as an on-demand system for continuously monitoring and automatically regulating the actuated condition of transfer clutch 50 in a manner that is independent of any deliberate action by the vehicle operator.

Power transfer system 10 is also operable to permit transfer case 20 to be shifted out of any available part-time or full-time four-wheel drive modes and into the Neutral non-driven mode. Specifically, upon mode select mechanism 62 signalling selection of the Neutral mode, gearmotor 192 is actuated for causing sector plate 196 to rotate to its Neutral sector position. Preferably, transfer clutch 50 is shifted into its non-actuated state when transfer case 20 is operating in the Neutral mode. Moreover, while power transfer system 10 is capable of providing five different operative modes, in some applications it may be decided to limit the selection of available drive modes. For example, it is contemplated that mode select mechanism 62 could be easily adapted to permit selection of three drive modes, namely, the full-time four-wheel high-range drive mode, the Neutral mode, and either of the full-time part-time four-wheel low-range drive modes.

Figure 7:
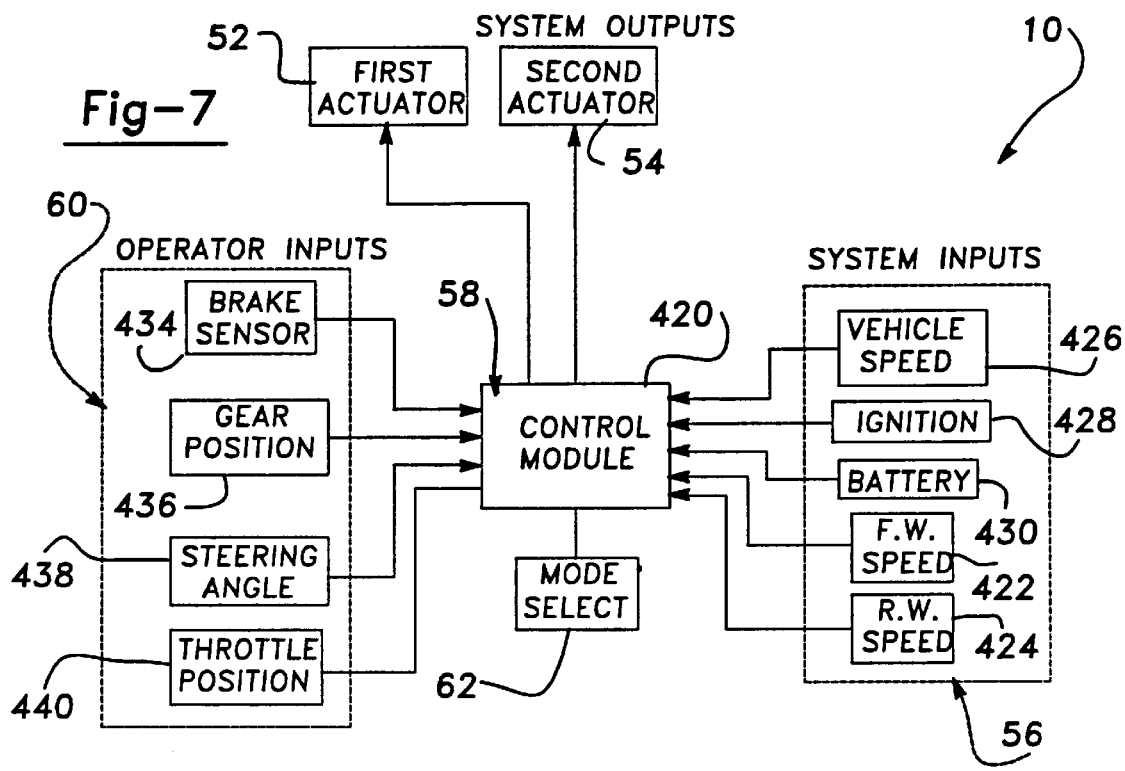
FIG. 7 is a block diagram of a control system for the power transfer system of the present invention.

With particular reference now to FIG. 7, a block diagram of a control system associated with power transfer system 10 is shown. Preferably, controller 58 is an electronic control module 420 having signal processing and information storage capabilities. In addition, first sensor group 56 is shown as a group of various "system" sensors that are provided for detecting and signaling specific dynamic and operational characteristics of the motor vehicle. The input signals generated by the "systems" sensors are. delivered to electronic control module 420. Preferably, these sensors include a front speed sensor 422 for sensing the rotational speed ($n_F$) of front prop shaft 30, a rear speed sensor 424 for sensing the rotational speed ($n_R$) of rear drive shaft 40, a vehicle speed sensor 426 for sensing a vehicle speed (V), an ignition switch 428 for signalling the operational status of the vehicle, and a battery input 430 for powering electronic control module 420. In vehicles equipped with an anti-lock brake system (ABS), the original equipment ABS sensors provided at each wheel can be used for determining an "average" front drive shaft speed and rear drive shaft speed. Alternatively, front and rear speed sensors 422 and 424, respectively, can be arranged for directly measuring the speed of front output shaft 32 and rear output shaft 42, respectively. Moreover, it is possible for vehicle speed sensor 426 to be eliminated with the vehicle speed signal (V) being computed from the lower valued one of rotational speed signals ($n_F$) and ($n_R$). However, it is to be understood that any suitable speed sensing arrangement capable of generating a signal indicative of the rotational speed of a shaft is fairly within the scope of the present invention.

The control system may also utilize various "operator-initiated" inputs, as generally categorized by second sensor group 60. These inputs include a brake sensor 434 for sensing when the vehicle operator is applying the brakes, a gear position sensor 436 for sensing a gear position of transmission 18, a steering angle sensor 438 for detecting the magnitude of a steering angle ($\phi$), and an accelerator sensor 440 for sensing an accelerating condition of the vehicle. Preferably, the accelerator sensor 440 is a throttle position sensor for sensing the degree of opening of a throttle valve associated with engine 16 or for sensing the degree of depression of an accelerator pedal and to produce a throttle position signal (A). The operator-initiated input signals are delivered to control module 420 where they are used, in conjunction with the system input signals.

Figure 8:
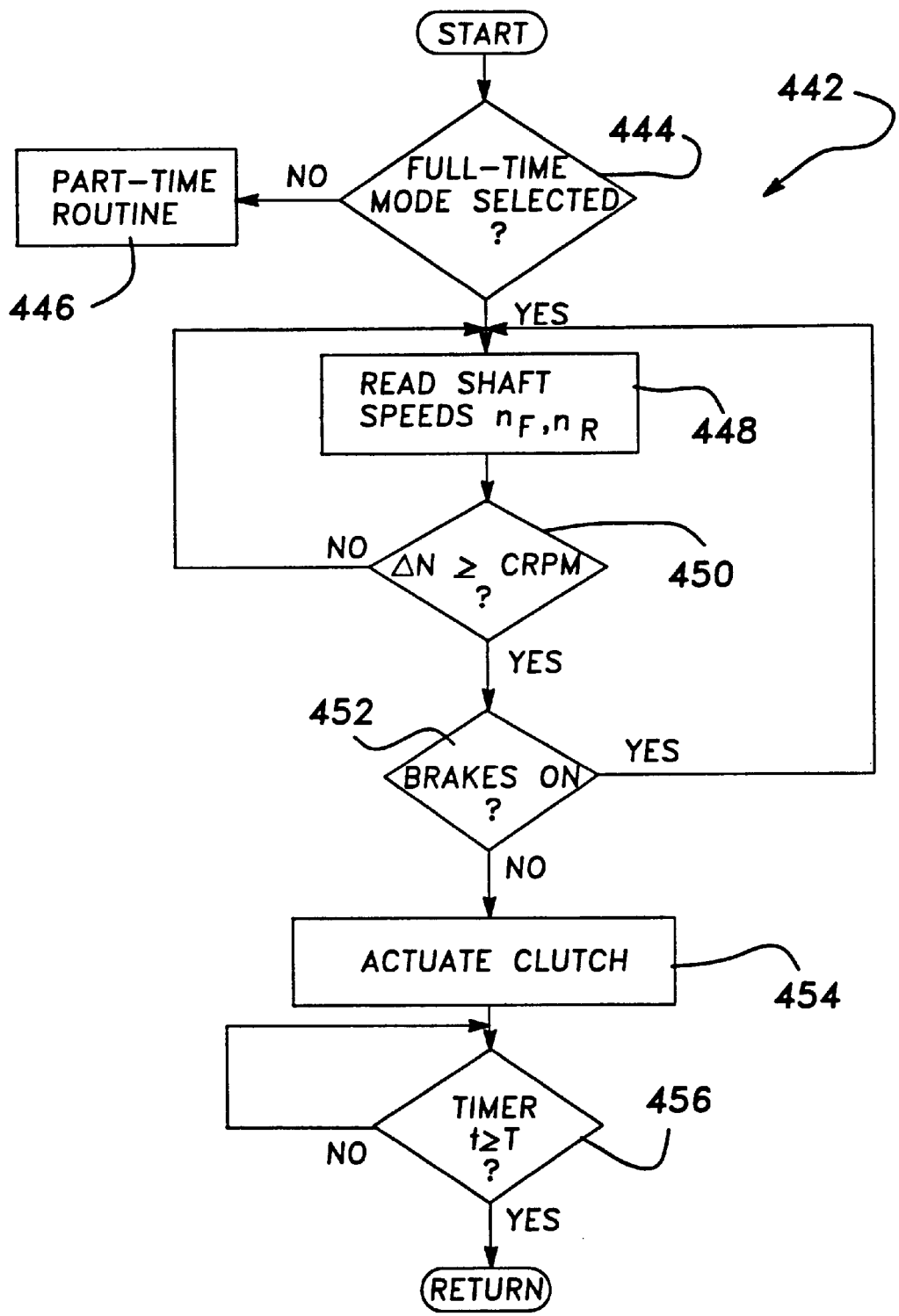
FIG. 8 is a flow chart depicting an ON/OFF control sequence for the operations performed by the control system of FIG. 7.

With reference to FIG. 8, a control sequence for "on-demand" control of the full-time drive modes under the ON/OFF control scheme is shown in a flow chart 442. In general, flow chart 442 represents a sequence of operations performed by electronic control module 420 and which are diagrammatically shown in block form. When mode select mechanism 62 signals selection of an available full-time mode, as indicated by block 444, a succession of control steps are repeated for determining the value of the control signal to be applied to solenoid 406. Preferably, the control signal is selected in accordance with the current value of a interaxle speed differential ($\Delta N$). However, if any other mode is selected, then the control sequence jumps to a part-time routine, as indicated by block 446 which controls actuation of range actuator 52 and mode actuator 54 in the manner described.

Block 448 is representative of the control step in which the current value of the rotational speed of front drive shaft ($n_f$) and rear drive shaft ($n_r$) are read. In block 450, control module 420 determines the current value of the speed differential signal ($\Delta N$) and compares it with stored information to determine if the current value of the speed differential signal ($\Delta N$) is equal to or exceeds a predetermined threshold maximum value (CRPM). The threshold maximum value (CRPM) is selected to permit a normal amount of interaxle speed differentiation of the type typically associated with the motor vehicle being steered into a tight turn or corner. Therefore, the maximum threshold value (CRPM) is selected to permit normal interaxle speed differentiation without causing on-demand lock-up of transfer clutch 50. If the current value of the speed differential ($\Delta N$) is less than the maximum threshold level (CRPM), then the control routine returns to the process step identified at block 448 to be repeated in a continuous manner. Block 452 is indicative of the input signal generated by brake sensor and delivered to control module 420. Accordingly, if the vehicle operator is attempting to stop the vehicle by applying the brakes during an occurrence of a low traction road condition (i.e., $\Delta N$ is equal to or greater than CRPM) then control module 420 prevents on-demand activation of transfer clutch 50. Thus, simultaneous braking and on-demand four-wheel drive operation is prevented to provide the vehicle operator with greater control. However, during the occurrence of a low traction condition (where $\Delta N$ is equal to or greater than CRPM) and the vehicle operator is not applying the brakes, control module 420 automatically sends a control signal to solenoid 406 for causing spool valve 408 to move from its first position to its second position, as shown in block 454, thereby fully-actuating transfer clutch 50. As shown in block 456, a timer circuit is actuated simultaneously with actuation of solenoid 406 for maintaining solenoid 406 in its actuated condition for a predetermined time period (T). Once the period of solenoid actuation (t) equals the predetermined time period (T), control module 420 repeats the control routine. Thus, transfer clutch 50 will be maintained in its fully-actuated condition until the calculation at block 448 indicates that the speed differential has been reduced below the maximum threshold level.

Figure 9:
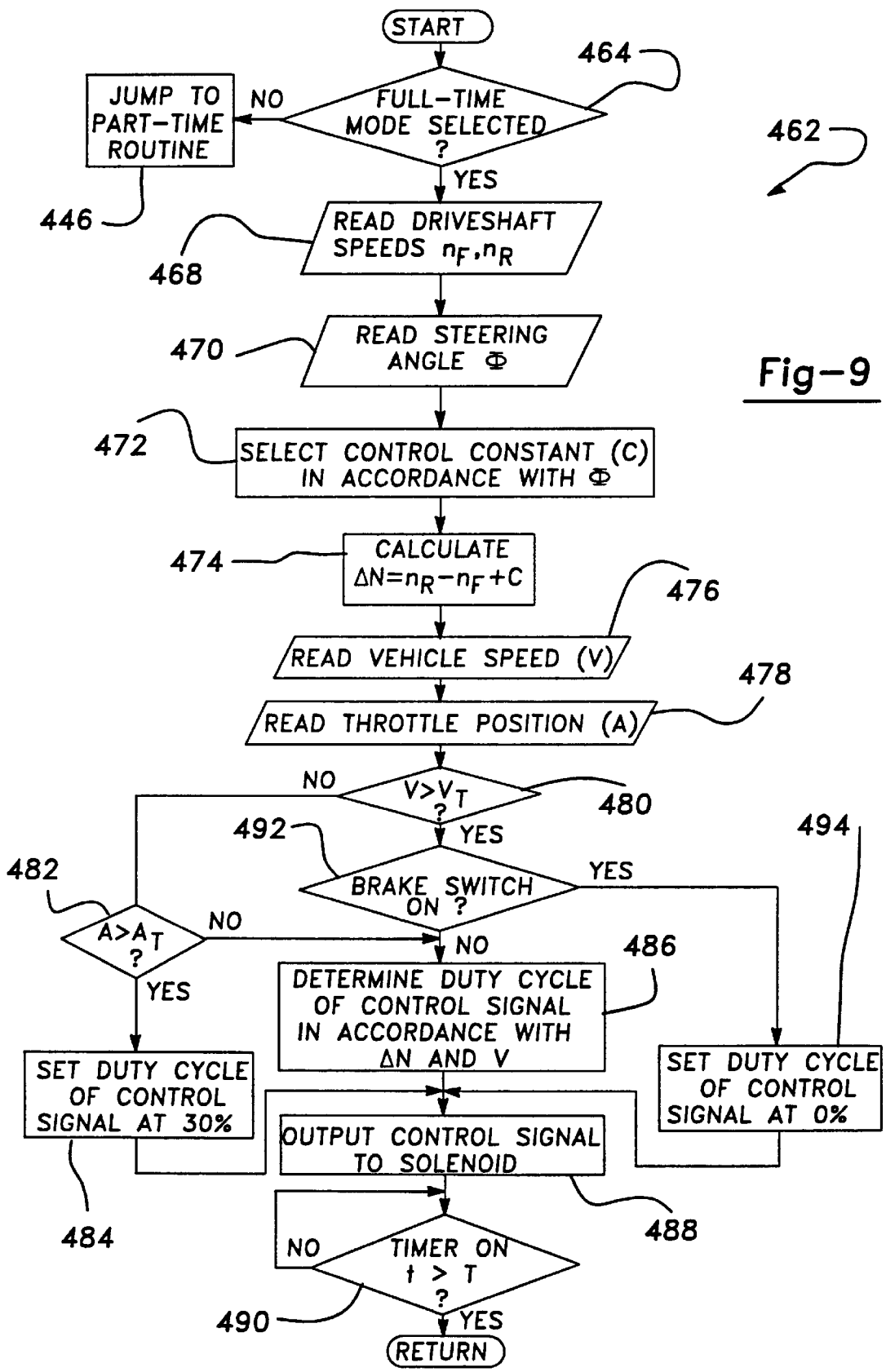
FIG. 9 is a flow chart depicting an ADAPTIVE control sequence for the operations performed by the control system of FIG. 7.

With reference now to FIG. 9, a control sequence for the selection and the subsequent "on-demand" control of the full-time drive modes under the ADAPTIVE control scheme is shown in a flow chart 462. In general, flow chart 462 represents a sequence of operations performed by electronic control module 420 which are diagrammatically shown in block form. When mode select mechanism 62 signals selection of an available full-time mode, as indicated by block 464, a succession of control steps are repeated for determining the value of the control signal to be applied to solenoid 406. As noted, under the ADAPTIVE scheme, control valve 370 would be of the variable output type to permit continuous pressure regulation. In the preferred form, the control signal is selected in accordance with various predefined relationships between the current value of the interaxle speed differential ($\Delta N$) and vehicle speed (V), as modified by current value of the steering angle ($\phi$) and other operator-initiated inputs. However, if any other mode is selected, then the control sequence jumps to a part-time routine, as indicated by block 446. Block 468 is representative of the control step in which the current value of the rotational speed of front drive shaft ($n_F$) and rear drive shaft ($n_R$) are read. Block 470 indicates the step of reading the value of steering angle ($\phi$) as detected by steering angle sensor 438. Block 472 represents the operation of selecting a control characteristic (C) in accordance with the detected steering angle ($\phi$). Next, block 474 represents the step of calculating the value of the speed differential ($\Delta N$) according to the equation $$\Delta N = n_R - n_F + C$$

Blocks 476 and 478 indicate the steps of reading the current value of the vehicle speed (V) as detected by vehicle speed sensor 426 and the throttle position (A) as detected by throttle position sensor 440. As shown in block 480, control module 420 determines whether the vehicle speed (V) exceeds a predefined threshold value ($V_T$) such as, for example, 5 mph. If the vehicle speed is less than the threshold value ($V_T$), a second determination is made at block 482 as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electric control signal sent to solenoid 406 is set as a preset value, such as 30% duty cycle, as indicated by block 484. In this manner, power transfer system 10 is adapted to transfer increased drive torque to front wheels 24 in response to quick acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential ($\Delta N$) and vehicle speed (V), as indicated by block 486. Block 488 represents the step of outputting the electric control signal to solenoid 406 for developing the desired amount of torque transfer, if any, across transfer clutch 50. As shown in block 490, a timer circuit is actuated simultaneously with energization of solenoid 406 for maintaining such energization for a predetermined time period (T). Once the period of energization (t) equals the predetermined time period (T), control module 420 repeats the control routine.

To enhance steering control, block 492 is indicative of the control step between steps 480 and 486 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 434) during an occurrence of a low traction road condition and the vehicle speed (V) is greater than the predefined threshold ($V_T$), then control module 420 sets the magnitude of the control signal sent to solenoid 406 to zero, at block 494 for de-actuating transfer clutch 50. This control sequence prevents simultaneous braking and torque-modulated full-time four-wheel drive operation for providing the vehicle operator with greater steering and braking control. However, during the occurrence of a low traction condition when brake sensor 434 signals control module 420 that the vehicle operator is not applying the brakes, electronic control module 420 automatically energizes solenoid 406 for actuating transfer clutch 50 in accordance with the relationships generally denoted by block 486.

Figure 10:
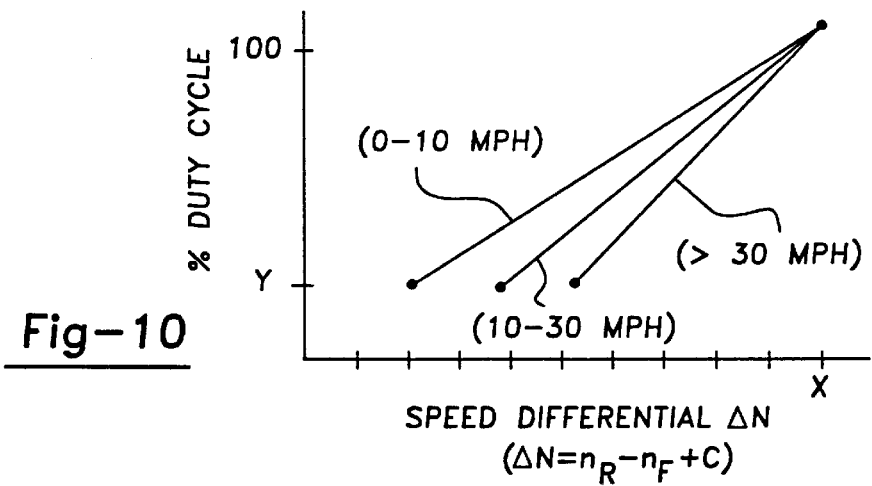
FIG. 10 illustrates plots of relationships between interaxle speed differential signals at various vehicle speed ranges and the electrical control signal supplied under the ADAPTIVE control sequence for controlling torque transferred across the clutch assembly.

With particular reference to FIG. 10, a set of plots that can be used with the ADAPTIVE control scheme for establishing the magnitude of the duty cycle for the control signal sent to solenoid 406 in response to the current value of the speed differential ($\Delta N$) and the vehicle speed (V) during full-time operation, as diagrammatically referred to by block 486 in FIG. 9, will now be detailed. As seen, power transfer system 10 is programmed to correlate the percentage duty cycle of the electric control signal to a range of speed differential ($\Delta N$) values. In general, the percentage duty cycle for the control signal increases from a minimum actuation value (Y%) to a maximum actuation value (100%) as the value of the speed differential ($\Delta N$), within a particular vehicle speed range, increases from a minimum speed differential limit to a maximum speed differential limit (X). As such, when the value of the speed differential ($\Delta N$) is less than the minimum speed differential limit, no drive torque is transferred through transfer clutch 50. However, when the value of the speed differential ($\Delta N$) exceeds the minimum differential limit, a control signal is supplied to solenoid 406 having a duty cycle value greater than (Y%). Thus, the minimum actuation duty cycle (Y%) for the control signal correlates to the point at which sufficient frictional engagement between the interleaved clutch plates results in the delivery of a portion of the total drive torque to slower turning output shaft of transfer case 20 for initiating "on-demand" limited slip control during a full-time four-wheel drive operation.

Preferably, the portion of the total drive torque transferred through transfer clutch 50 to the slower turning output shaft increases as the magnitude of the duty cycle for the control signal increases from the minimum actuation value (Y%) to the maximum actuation value (100%). Preferably, the maximum value (X) of the speed differential ($\Delta N$) correlates to the maximum actuation duty cycle (100%) at which point the maximum clutch engagement force is generated for completely locking-up transfer clutch 50. Part-time routine 446 is directed to controlling power transfer system 10 when the vehicle operator selects a operational mode via mode select mechanism 62 other than one of the full-time four-wheel drive modes. Specifically, control module 420 is adapted to supply a control signal to gearmotor 192 for rotating sector plate 196 to the particular sector position corresponding to the selected range while a control signal sent to solenoid 406 controls actuation of transfer clutch 50.

Due to the use of bi-directional synchronized range shift mechanism 46, transfer case 20 can be shifted "on-the-fly" into any available drive mode without the requirement that the motor vehicle be in a non-motive condition. Controller 58 can be programmed to prevent high-range to low-range shifts when the vehicle speed exceeds a predetermined speed, most preferably in the range of about 30 to 50 miles per hour. Alternatively, synchronizer clutch apparatus 108 can be equipped with a shift inhibitor mechanism for preventing such a high to low range shift above a certain vehicle speed. Commonly-owned U.S. Pat. No. 4,901,835 to Frost discloses one type of shift inhibitor applicable for use with the present invention. As will also be appreciated, any suitable type of synchronizer device (i.e., single-cone, dual-cone, multi-cone, strut-type, strutless, etc.) can be used with synchronized range shift mechanism 46.

The foregoing discussion discloses and describes the preferred structure and control system for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A planetary gear assembly comprising:

an input shaft;

an output shaft;

a first sun gear fixed to said input shaft;

a second sun gear;

a planet carrier fixed to said output shaft and rotatably supporting a set of first planet gears meshed with said first sun gear and a set of second planet gears meshed with said second sun gear and said first planet gears;

a first clutch assembly operable in a non-actuated mode for permitting rotation of said planet carrier relative to said input shaft and operable in an actuated mode for coupling said planet carrier for rotation with said input shaft;

a second clutch assembly operable in a non-actuated mode for permitting relative rotation between said second sun gear and a stationary component and operable in an actuated mode for coupling said second sun gear to said stationary component; and an actuator for controlling the actuated modes of said first and second clutch assemblies to establish one of a high-range and a low-range drive connection between said input shaft and said output shaft, said actuator is operable for shifting said first clutch assembly into its actuated mode and said second clutch assembly into its non-actuated mode to establish said high-range drive connection, and said actuator is operable for shifting said first clutch assembly into its non-actuated mode and said second clutch assembly into its actuated mode to establish said low-range drive connection.

* * * * *